April 6, 1937.  W. U. VINTON  2,076,104
FILTER
Filed July 15, 1933   7 Sheets-Sheet 1

April 6, 1937.  W. U. VINTON  2,076,104
FILTER
Filed July 15, 1933   7 Sheets-Sheet 2

Inventor:
William Vinton

April 6, 1937.                W. U. VINTON                2,076,104
                                 FILTER
                            Filed July 15, 1933          7 Sheets-Sheet 7

Patented Apr. 6, 1937

2,076,104

UNITED STATES PATENT OFFICE 2,076,104

FILTER

William U. Vinton, Manitowoc, Wis.

Application July 15, 1933, Serial No. 680,537

5 Claims. (Cl. 210—200)

This invention relates to a process of filtration and to a filter construction, particularly designed and adapted for the practice of said process.

As the invention relates to a process of filtration, a principal object of the invention is to provide an improved process by means of which filtration of feed pulps—as slurry, slimes and the like—may be performed rapidly, efficiently, economically and in large volume, thus rendering the process available for use in the commercial separation and recovery of both the solid content of the feed pulp being treated, and the filtrate.

As it relates to a process of filtration, my invention resides in subjecting the feed pulp to the sequence of operations hereinafter particularly described, pointed out and claimed.

As the invention relates to improvements in filters, a principal object of the invention is to provide a filter adapted for the practice of my improved process, by means of which filtration in accordance with my improved process may be effected as a substantially continuous operation, and to this end, a filter embodying my invention and improvements, comprises the various features, combinations of features and details of construction hereinafter described and claimed.

In the accompanying drawings, in which a filter embodying my invention and improvements and adapted for the practice of my improved process is shown.

Describing the invention with reference to the drawings, I will first describe what I now consider to be a preferable form of filter for the practice of my improved process, and will then describe the process as effected by said filter. However, as the invention relates to filter construction, I do not desire or intend to limit the protection of the patent to the particular structure shown and described, which merely illustrates a concrete embodiment of a wide range of modification and variation within the scope and contemplation of the invention, as defined by the appended claims.

Figures 1, 13:
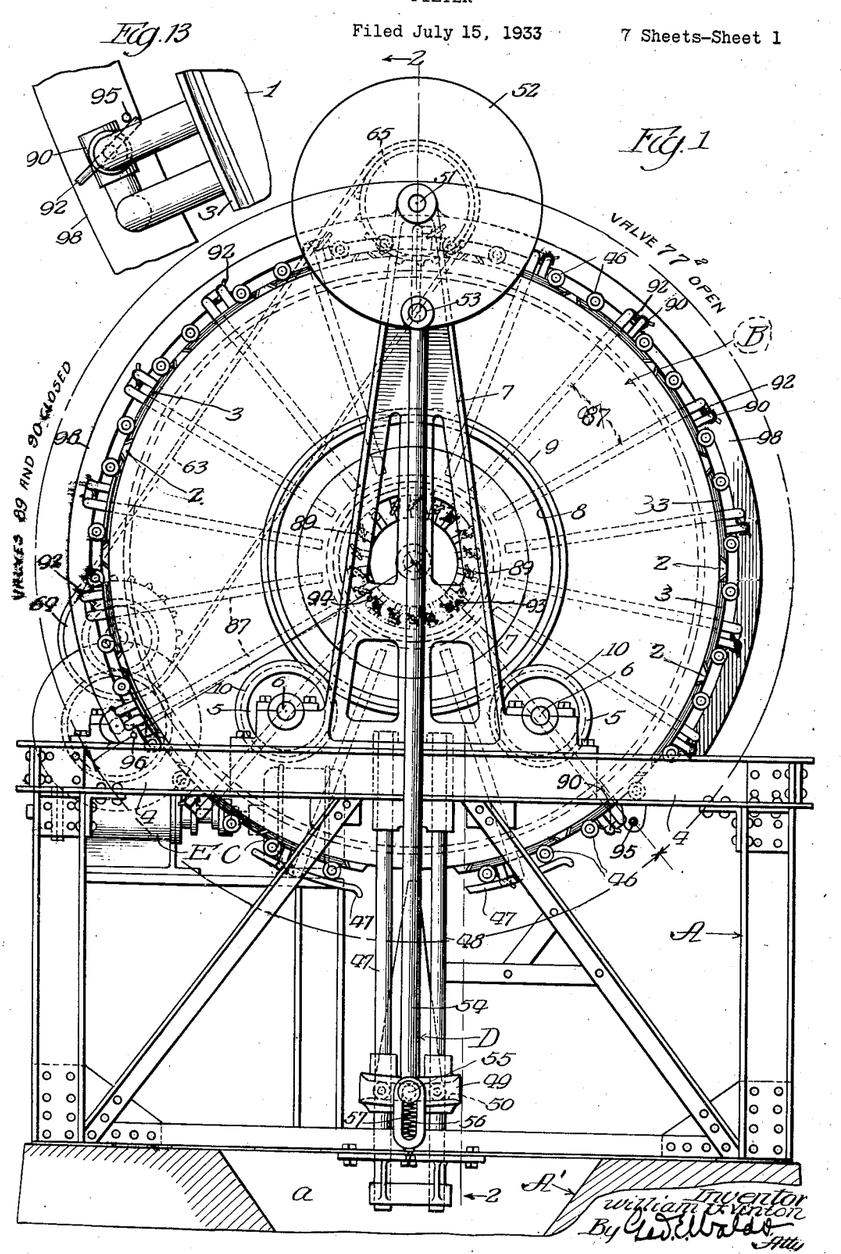
Fig. 1 is an end view of a filter embodying my invention and improvements and adapted for effecting filtration in accordance with my improved process, showing a filter unit in discharging position.
Figs. 13, 14 and 15 are enlarged, fragmentary, detail views.

The operative parts of the filter are mounted on a suitable frame designated as a whole A, best shown in Fig. 1, which, as shown, is made of structural steel and will be readily understood and can readily be constructed by engineers familiar with such structures without the exercise of invention. As shown, said frame A is erected on a suitable foundation designated as a whole A', which, in accordance with common practice, will be made of concrete, said foundation being provided with a hopper $a$ adapted to receive solid matter separated from the feed pulp and discharged from the filter proper in operation, known generally as filter cake. Filter cake delivered into the hopper $a$ is adapted to be removed from the lower end thereof by suitable means, not shown, but which may readily be supplied by mechanics familiar with devices for the purpose.

Figures 2, 2A:
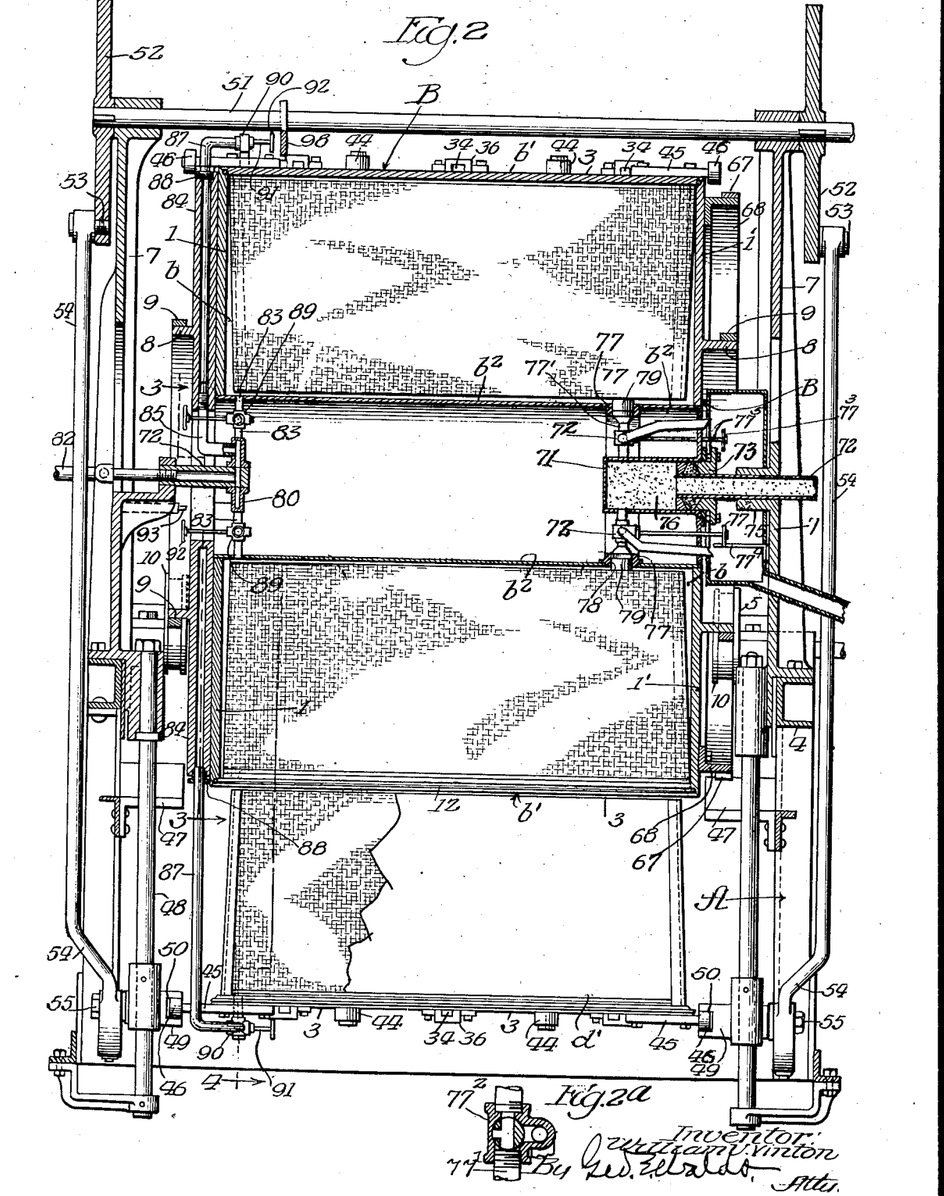
Fig. 2 is a view of the filter proper from the right side of Fig. 1, parts of the filter being shown in section substantially on the line 2—2 of Fig. 1.
Fig. 2a is an enlarged, detail view showing the feed pulp supply valve in section.
Figure 9:
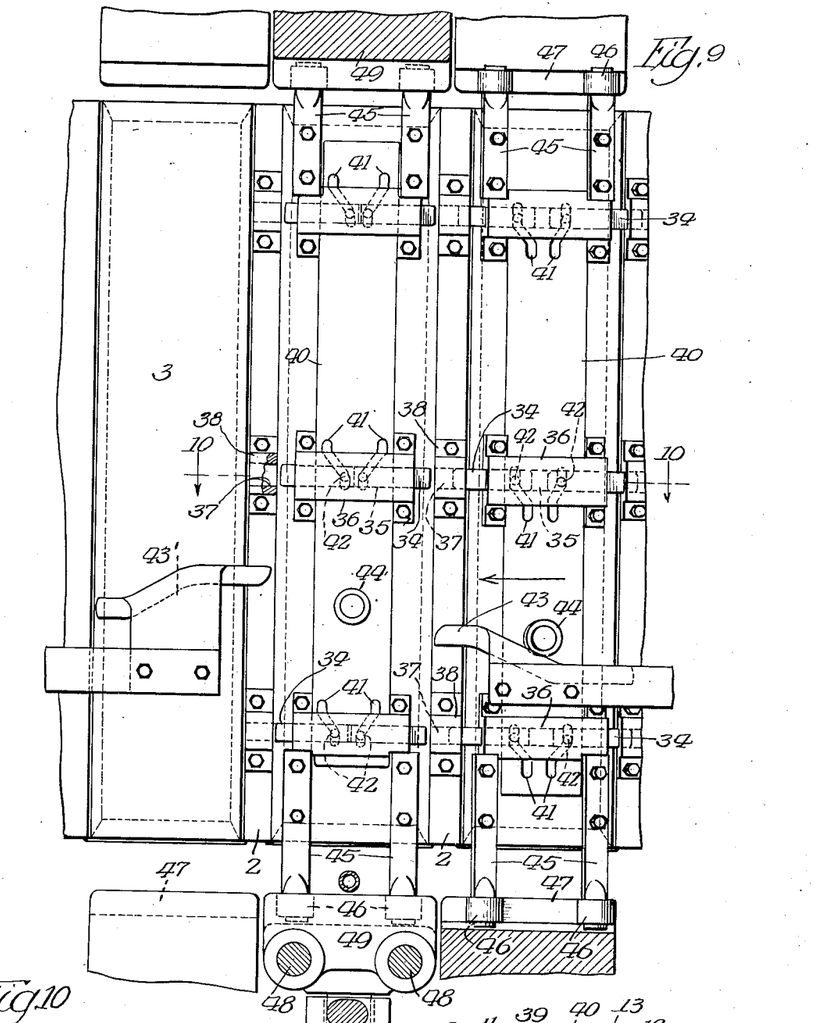
Fig. 9 is an enlarged, bottom plan view of the filter shell or casing, showing the locking means for securing the cover sections of the different filter chambers in closed position, and the operating mechanism for locking and releasing said locking means.
Figure 10:
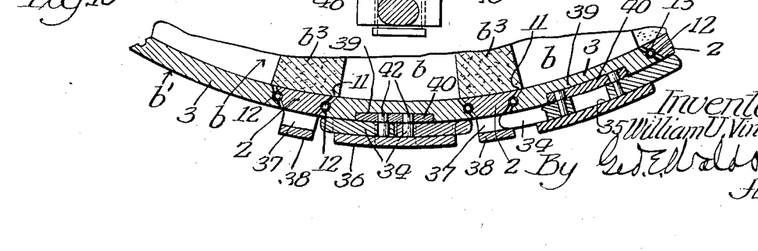
Fig. 10 is a fragmentary, sectional view on the line 10—10 of Fig. 9.

In accordance with my invention, see particularly Fig. 2, my improved filter comprises a plurality of filter units, presently described, operatively mounted in compartments $b$ formed in a drum B which consists of end walls 1, 1', preferably made of cast iron or steel, an outer cylindrical shell or casing designated as a whole $b'$ comprising separate sections 2 and 3, of which the sections 2 are rigidly and permanently secured to the perimeters of the heads 1, 1', and the sections 3 are detachably secured thereto by suitable locking means, best shown in Figs. 9 and 10, presently described.

The drum B also comprises an inner open-ended cylinder $b^2$ the ends of which are rigidly and permanently secured in holes or openings formed in the end walls 1, 1' of said drum.

The outer shell or casing $b'$ and the inner cylinder $b^2$ are made of suitable sheet metal, preferably boiler plate of suitable thickness to impart adequate strength to the drum B to withstand the stresses to which it will be subjected in use.

Figure 12:
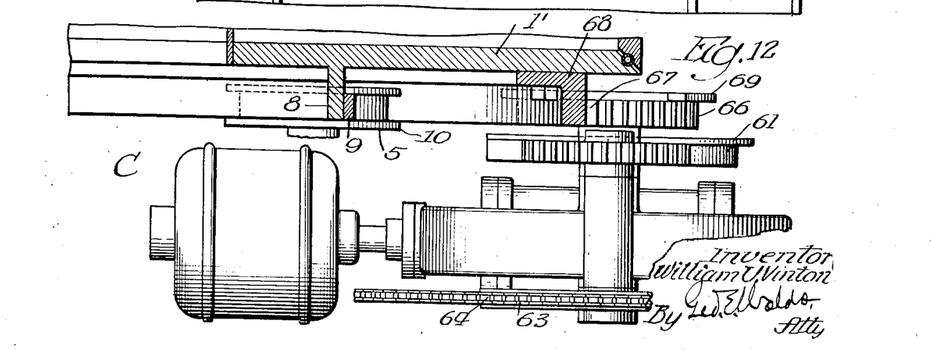
Fig. 12 is a fragmentary, top-plan view from the position 12—12 of Fig. 11.

As shown, Fig. 1, the drum B is rotatably mounted on transverse frame members 4 by means of flanged rollers 5 secured to stub shafts 6 rotatably mounted in bearings formed at the lower ends of standards 7, supported on said frame members 4, and trunnions 8 consisting, as shown, see Fig. 12, of cylindrical flanges formed on the end walls or heads 1, 1', of the drum B, secured to which are metal treads 9 which run on the supporting rollers 5 and which interlock with grooves defined by flanges 10 of said supporting rollers. In operation, step-by-step rotation is imparted to the drum B by driving connection with a source of power, specifically an electric motor C mounted on the frame A, all as hereinafter described.

As shown, the compartments $b$ are formed by partitions $b^3$ and during operation are subjected to considerable pressure, say for usual purposes, from 50 to 90 pounds per square inch, which, under certain operating conditions, will be unbalanced and will develop relatively high stresses in said partitions, necessitating that they be made sufficiently strong to withstand and be unaffected by such stresses.

Figures 4, 4A:
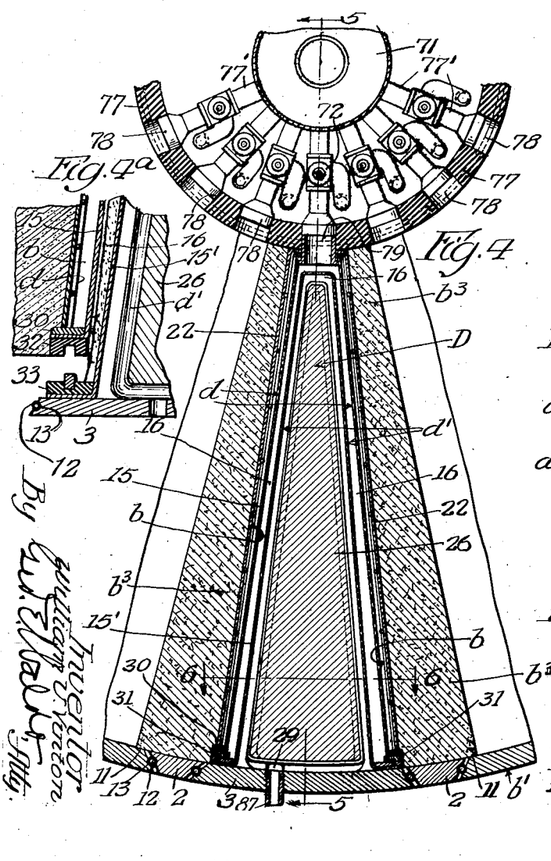
Fig. 4 is an enlarged, sectional view substantially on the line 4—4 of Fig. 2, showing a filter unit in closed or operating position.
Fig. 4a is an enlarged, fragmentary view of parts shown in Fig. 4.

As shown, see particularly Fig. 4, the partitions $b^3$ are made of concrete of a thickness to impart necessary strength thereto, and may be reinforced, if found necessary or desirable. In the preferable construction shown, also, said partitions taper inwardly, the sides thereof being positioned in planes at the intersection of which, the axis of rotation of the drum B is positioned, thus imparting a wedge-shape thereto and also to the compartments $b$ formed thereby. Also, to reduce the weight of the drum B, relatively light weight concrete, as hadite, will be used.

The sections 2 of the shell or casing $b'$ are arranged symmetrically with reference to the partition $b^3$ and are so proportioned, circumferentially of the drum B, that shoulders 11 will be formed thereon at both sides of said sections 2, see Fig. 4. Also, the shell or casing sections 3 are proportioned to fit into the spaces between adjacent casing sections 2 with their opposite edges resting on the shoulders 11, the proximate edges of adjacent sections 2 and 3 of the shell or casing $b'$ and also the ends of said casing sections 3 and the sectors of the perimeters of the end walls 1, 1' in line with said casing sections 3, being correspondingly and oppositely inclined or tapered as shown, see particularly Figs. 4, 5 and 15.

Figures 3, 14, 15:
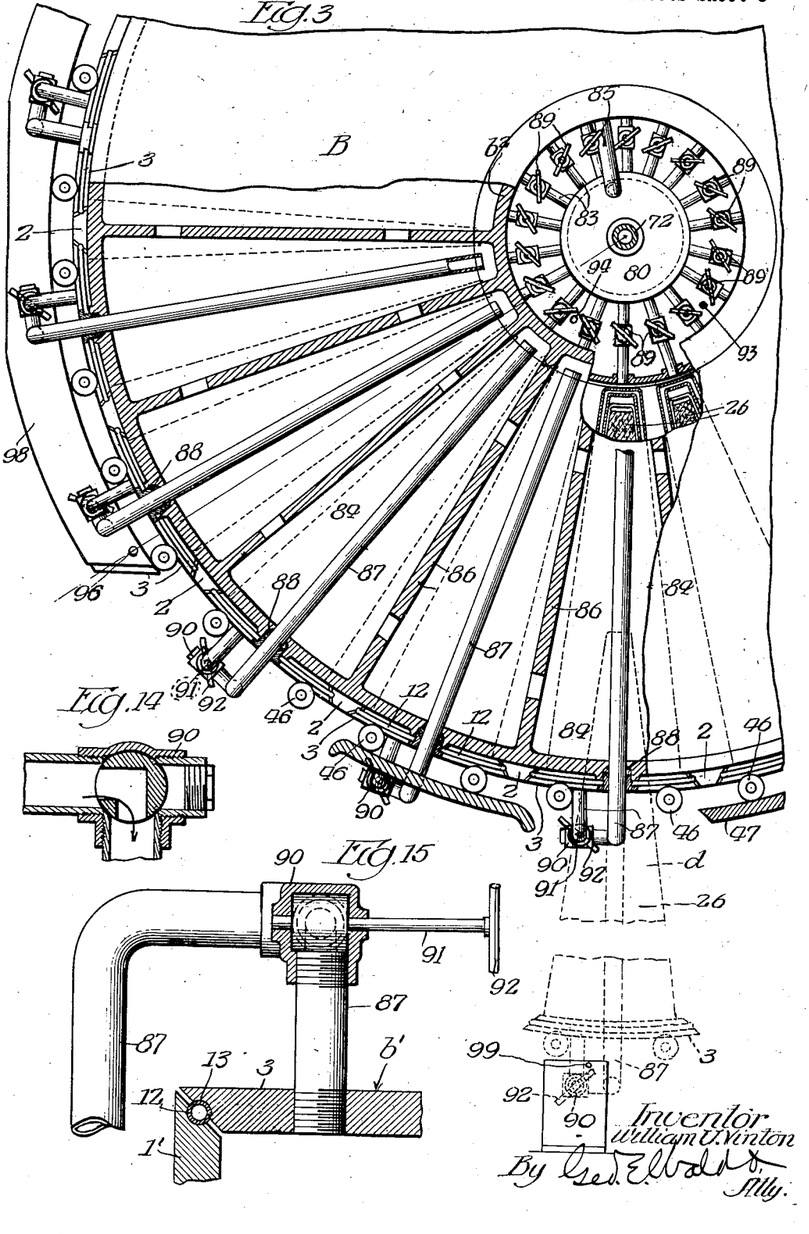
Fig. 3 is an enlarged, fragmentary, end view from the left side of Fig. 2, partly in elevation and partly in section on the line 3—3 of Fig. 2, and with part of the end wall of the drum or casing of the filter broken away.

Leakage at the joints between the casing sections 2 and 3 and between the ends of the casing sections 3 and the opposed sectors of the end walls 1, 1' of the drum B, is prevented by suitable packing consisting, as shown, see particularly Fig. 15, of rubber tubes 12 seated in grooves 13 formed entirely around the inclined or beveled edges of the casing sections 3, in the beveled edges of the casing sections 2 and, also, in the beveled sectors of the perimeters of the end walls of the drum B in line with the casing sections 3, the relation being such that when the casing sections 3 are in position to close the open sides of the compartments to which they are applied, respectively, said tubes will be subjected to pressure. In practice, the packing tubes 12 may be maintained distended by air under pressure introduced into the same.

In accordance with my invention, a filter unit designated as a whole D, is mounted in each compartment $b$ of the drum B and will now be described. However, all of said filters are similar in construction, as near as may be, and one description will apply equally to all, and the following description is, therefore, in the singular.

Referring now particularly to Figs. 4 to 8' of the drawings, a filter unit embodying my invention and improvements, consists of separate outer and inner filter members designated, respectively, as a whole $d$, $d'$, which, respectively, comprise filter media 15, 15', and supporting means therefor, the relation being such, see particularly Figs. 4 to 7, that said filter media will define a space 16 between the same, into which the feed pulp to be filtered is delivered in operation, as presently will be described.

In what I now consider the preferable embodiment of the invention, the filter media 15, 15' are made of suitable pliable filter fabric, preferably cotton duck, which may readily adapt itself to different configurations, said filter media also preferably being fashioned to provide sufficient fullness therein that they may readily conform to corrugations formed in the supporting walls of the filter members $d$, $d'$, hereinafter described. To insure spaces 16 of suitable width, distention of the filter media 15, 15', by pressure in the air chambers of the filter units D, preferably is limited by suitable means, as strands $15^2$ of small flexible copper wire which anchor said filter media to fixed parts of the filter structures.

Figure 8:
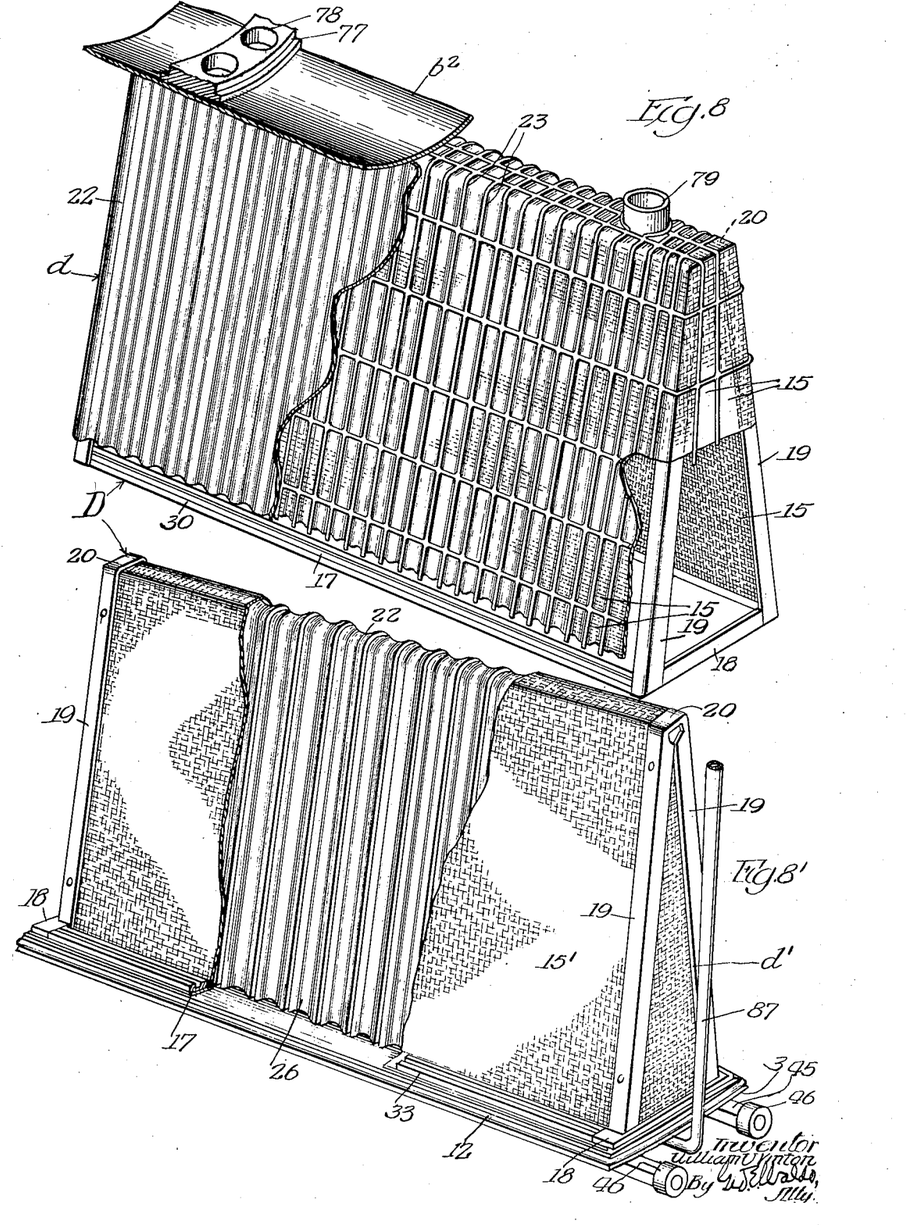
Figs. 8, 8' are enlarged, detached views of the outer and inner members of a filter unit, the inner member being withdrawn from the outer member.

The filter media 15, 15', are fashioned to form what may be described as hoods, which are maintained distended by adjusting them to skeleton frames or forms, best shown in Figs. 2, 8 and 8'.

Figures 5, 6, 7:
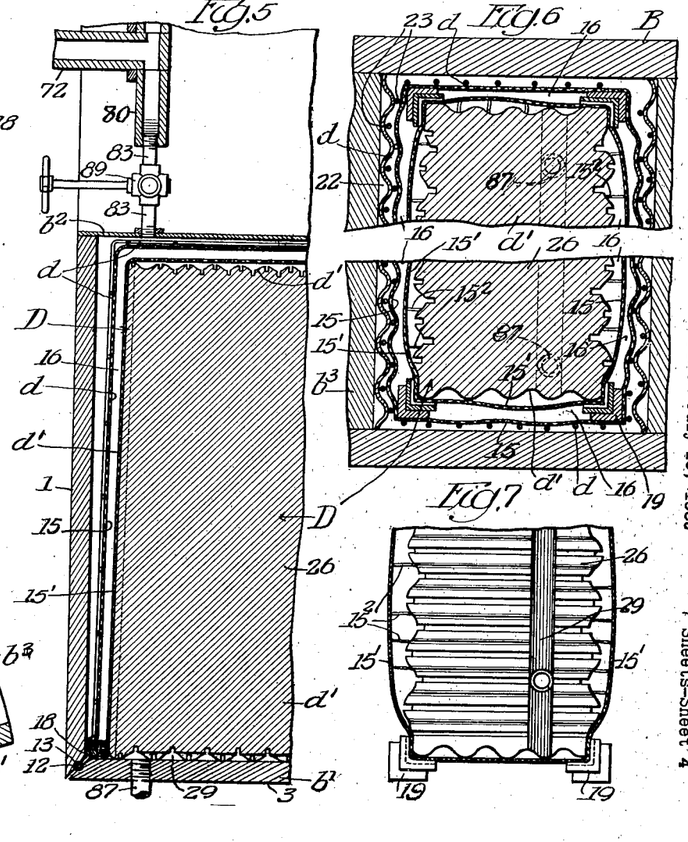
Fig. 5 is a fragmentary view on the line 5—5 of Fig. 4.
Fig. 6 is an enlarged, sectional, plan view of a filter unit, substantially on the line 6—6 of Fig. 4.
Fig. 7 is a detached, fragmentary, bottom plan view of an end of the inner member of a filter unit.

As shown, said supporting frames conform substantially to the shape of the compartment $b$, being substantially wedge-shaped, and are so proportioned that the frame of the inner unit $d'$ will nest into the frame of the outer unit $d$, as shown in Fig. 6.

The supporting frames of both filter members are substantially similar to each other, each comprising, see Figs. 8, 8', a substantially rectangular base consisting of side bars 17, transverse bars 18 which rigidly connect opposite ends of said side bars, angle bars 19 secured in endwise position to the corners of said base and which extend laterally therefrom in such relation that they will form a structure of desired shape, the ends of said angles remote from said base at the same end and opposite sides of the frame being connected by transverse members 20, which, as shown, are integral with the angles 19 which they connect, the webs of said transverse portions being cut away, as shown, to permit bending the same without distortion.

As previously stated, the side walls of each filter chamber b are provided with corrugations 22 which extend substantially radially of the drum B and which may conveniently be formed by securing corrugated plates to the side walls of the filter compartment, as shown in Figs. 4 to 7, crossed wires serving to space the outer filter medium from the outer corrugated plate, and providing circulating spaces for filtrate and air which passes through said filter medium, said wires being joined together where they cross and contact with each other.

Also, the support for the inner filter member 15' comprises what may be designated a core 26 mounted within the inner filter medium 15' and which is provided with corrugations and drainage grooves or channels which extend entirely around the same, as shown, and which serve in lieu of the crossed wires utilized to space the outer filter medium from the corrugations in the walls of filter chambers, to provide air and water circulation spaces in connection with the filter medium 15' of the inner filter member d'. As shown, also, said core 26 is provided with a groove 29 which connects all of the corrugations formed in the surface of said core.

As shown, see Fig. 4ª, the edges of the hood formed by the filter medium 15 of the outer filter member d are permanently and detachably secured to the partition b³ adjacent the open side of the compartment b in which the filter unit is mounted, by clamping the edges of said hood between bars 30 secured in a rabbet formed in the wall of said compartment around its open side, and metal strips 32 removably secured to said bars in any suitable manner.

The core 26 forming part of the inner filter member d' is preferably made of wood and preferably will be treated to render the same impermeable to water.

Each inner filter unit d' is mounted on a movable casing section 3, the core 26 being rigidly secured thereto in any suitable manner, and the hood formed by the inner filter medium 15' also being permanently and detachably secured to said casing section by clamping the edges thereof between said casing section and detachable metal strips 33.

To render the filter units D accessible and to provide for discharging the contents thereof—particularly filter cake formed on the filter media in operation, the casing sections 3—as previously stated—are detachably secured in position by suitable locking means consisting, as shown, see particularly Figs. 9 and 10, of bolts 34 slidably fitted to bearings 35 formed in blocks 36 secured to the outer sides of said casing sections 3 and which are adapted to engage sockets 37 formed in blocks 38 on the fixed casing sections 2, as shown.

Engagement and disengagement of the bolts 34 with and from the sockets 37 is effected automatically by means rendered operative by rotation of the drum B, as follows, see particularly Figs. 9 and 10: Slidably fitted to grooves 39 formed in the outer sides of the casing sections 3, are plates 40 formed in which are cam slots 41 to which studs 42 secured in the locking bolts 34 are slidably fitted, the relation being such that endwise movement of the plates 40 in opposite directions, will operate to advance and retract said bolts to effect engagement and disengagement thereof with the sockets 37 formed in the blocks 38 secured to the fixed casing sections 2.

As shown, endwise movement to actuate said bolts 34 is imparted to the plates 40 first to unlock and then to again lock said bolts, by properly shaped and positioned cam plates 43, 43' secured in fixed positions on the frame A of the filter, the operative faces of which are adapted to engage roller studs 44 on the plates 40 as the movably supported casing sections 3 are at the under side of the drum, in designed position for discharging the contents of the corresponding compartment b of the filter, the relation being such that, as a compartment b approaches discharging position, the roller stud mounted on the plate 40 carried by the casing section 3 corresponding thereto, will first engage the cam plate 43, which will operate to retract the bolts 34 to disconnect the said casing section from the drum B and later—after the contents of the compartment have been discharged and said casing section again moved into position to close said compartment, will engage the cam 43', which will operate to move said plates 40 in a direction to advance the locking bolts 34 into engagement with the sockets 37 in the block 38 on the adjacent, fixed casing sections 2.

As previously stated, step by step rotation is imparted to the drum B, dumping or discharging position of the compartments b being that in which they are stationary at the lowermost side of said drum, as shown in Figs. 1 and 3, in which the casing section 3 is between the cam plates 43, 43' with the bolts 34 withdrawn, thus leaving said casing section free to fall by gravity.

During the time between retraction and advancement of the bolts—before and after the dumping or discharging of a compartment b—the casing section 3 corresponding to said compartment, is supported by means as follows: Secured to and projecting beyond both ends of each casing section 3, are rods or bars 45, mounted on which are rollers 46, and mounted on the frame of the filter are track members 47 positioned at opposite sides of a compartment b, when in discharging position, as shown, the relation being such that during retraction and advancement of the bolts 34, the rollers 46 of corresponding casing sections, will ride on said track members 47 and will support said casing sections in position to close the compartments to which they are applied, respectively.

Also, during the interval that said detached casing section is stationary during the dumping operation, it is supported in the following manner to permit it to move downwards to dump or discharge the compartment to which it is applied, see Figs. 1 and 2: Supported on the frame of the filter at opposite ends of the drum B, are pairs of guide rods 48, slidably fitted to each of which is a cross-head 49, which is proportioned to enter the space between the adjacent ends of the track members 47. Said cross-heads 49 are provided in their sides adjacent the drum B with channels 50, see Fig. 2, which are substantially concentric with the drum B when said cross-heads are in operative raised position, and their outer sides in alignment with the treads of the track members 47, as near as may be, the relation being such that, when the supporting rollers 46 of a casing section 3 are in engagement with the grooves 50 in the cross-heads 49, said casing section will be supported only by the cross-heads 49 and free to move vertically therewith—both to lower and raise said casing section, to open and close the open side of the compartment to which it is applied. In accordance with my invention, also, the cross-heads 49—and with them a casing section 3 supported thereby—are adapted to be lowered and raised to open and close a compartment to which said casing section is applied, by means as follows, see Figs. 1 and 2: Rotatably mounted in bearings formed at the upper ends of the standards 7, is a shaft 51, the ends of which project laterally at both ends of the filter and secured to the projecting ends of which are crank disks 52, crank pins 53 secured in which, are connected by connecting rods 54 with studs 55 secured in the outer sides of said cross-heads, the relation being such that at each revolution of the shaft 51, the cross-heads 49 will execute a complete cycle, corresponding to movement of a casing section 3 supported by said cross-heads, from fully closed to fully open position and return to fully closed position, the position of rest of said crank being that corresponding to fully closed position of a casing section 3 supported by the cross-heads 49. To avoid great nicety of adjustment between the vertical movement of the casing sections 3 and of the cross-heads 49—or what is the same thing, the throw of the cranks 53—said cross-heads preferably, are yieldingly supported, as by springs 56 inserted between the lower sides of slots 57 formed in the lower ends of the connecting rods 54 and rigid parts of said cross-heads, said springs being quite stiff and of such length that when a casing section 3 is fully seated on the drum B, said springs will be under sufficient compression to insure alignment of the grooves 50 in the cross-heads 49 with the track members 47.

As shown, intermittent rotation is imparted to the crank disks 52 by suitable driving connection of the crank shaft 51 with the armature shaft of the motor C, consisting, as shown, of a worm gear designated as a whole E, the worm shaft 58 of which is coupled directly to the armature shaft of the motor C, shafts 59 and 60 rotatably mounted in bearings on the filter frame, the shaft 59 forming part of the worm gear, and the shaft 60 being driven from said shaft 59 by a multilated gear 61 on the shaft 59 adapted to engage a gear 62 secured to the shaft 60, and a chain belt 63 adjusted to sprocket wheels 64 and 65 secured to the shaft 60 and to the crank shaft 51, respectively. As shown, said sprocket wheels are of the same diameter.

During operation of the filter, the motor C, the worm gear E and the mutilated gear 61 run continuously, and engagement of said mutilated gear with the gear 62 on the shaft 60 will occur just before the bolts 34, which support the casing sections 3 when in dumping or discharging position, are withdrawn, the springs 56 providing for any slight lack of synchronism between the time the teeth of the mutilated gear 61 engage those of the gear 62 on the shaft 60, and release of the casing section 3, in dumping position at any given time, by retraction of the bolts 34, and also insuring that said casing section will be fully seated momentarily prior to advancement of said bolts to again lock said casing section to the drum B.

The mutilated gear 61 and the gear 62 have the same number of teeth so that, at each revolution of said mutilated gear, the gear 62 will make a complete revolution. Also, the mutilated gear is made of such larger size than the gear 62, that between successive actuations of said gear 62, a dwell of a predetermined time interval—corresponding to the designed time interval for dumping or discharging a compartment—will be imparted to said gear 62, say 16 seconds—and the relation being such that said dwell will occur when the crank pins 53 are at the upper limit of their throw, corresponding to fully closed position of the casing section 3 supported by the cross-heads 49, at any given time.

Figure 11:
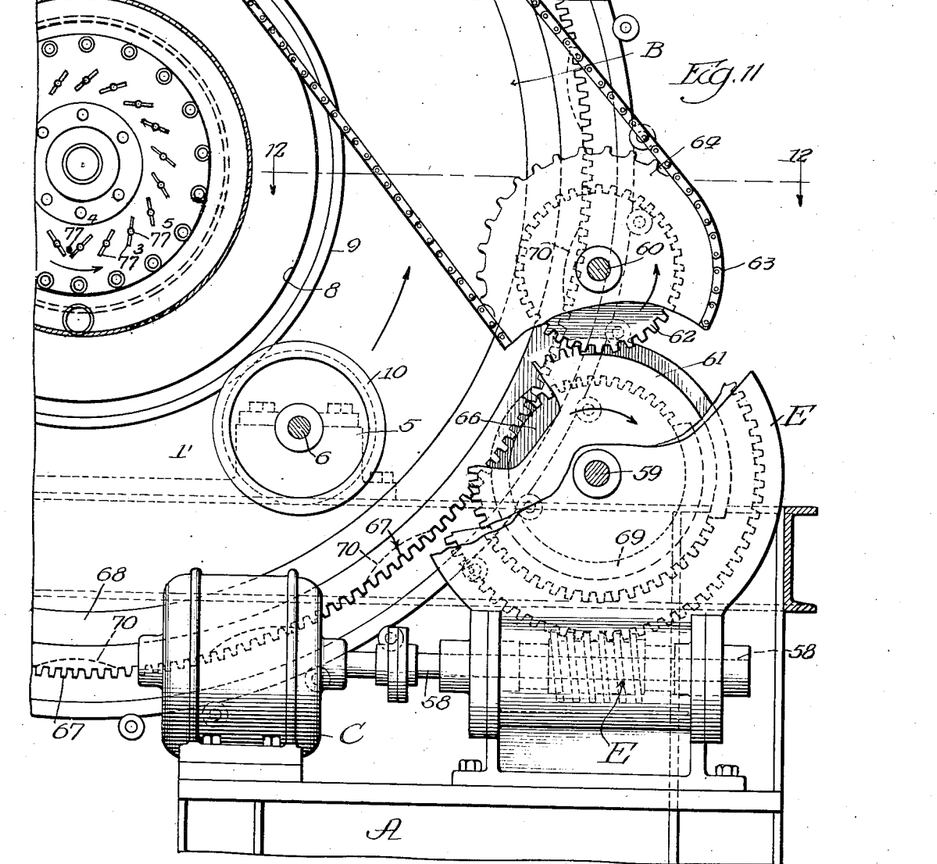
Fig. 11 is an enlarged, fragmentary end view from the far side of Fig. 1, showing the power means for operating the cylinder of the filter.

As previously stated, step-by-step rotation is imparted to the drum B in operation and, as shown, see particularly Figs. 11 and 12, this is effected in a simple manner, by means of a mutilated gear or pinion 66 secured to the shaft 59 of the worm gear E, which engages a gear 67 secured to a flange 68 on the end wall 1' of the drum B, see Fig. 2, the relation being such that each engagement of the mutilated gear or pinion 66 with the gear 67 will impart rotation to said drum through an arc equal to the angular distance between the centers of adjacent compartments b, and such also, that during periods of rest, a compartment will be in dumping or discharging position, in which position it is locked by suitable means consisting, as shown, of a segmental flange 69 on the mutilated pinion 66 which is proportioned and positioned to successively engage arcuate recesses 70 formed in the perimeter of the flange 68, and spaced angular distances apart, from center to center, circumferentially of the drum B, equal to the intermittent angular movement of said drum, the relation being such that when in position for engagement by the flange 69, said arcuate notches will be concentric with the mutilated pinion 66, but formed on a sufficiently longer radius to insure adequate clearance between said flange and the bottoms of said recesses, in operation. The relation is such, also, that engagement of the flange 69 with a recess 70 will define dumping position of a compartment b and the circumferential dimension of said flange being proportioned to hold the drum stationary during the entire dumping interval, at the expiration of which, said flange will pass out of engagement with said recess.

In operation, feed pulp to be filtered is delivered into the filter compartments b—directly into the spaces 16 between the filter media 15, 15'—from a tank 71 supported within and connected to the hollow cylinder $b^2$ so as to rotate therewith, operatively connected to which is a feed pulp supply pipe 72, through which feed pulp to be filtered is delivered to said tank, said feed pipe being connected to said tank by a gland 73, as shown, arranged to permit rotation of said tank relative to said pipe, in a familiar manner. Said pipe 72 communicates with a source of supply of feed pulp, not shown, the feed pulp delivered to the filter being maintained at desired operating pressure—say from 50 to 100 pounds per square inch—by suitable means as a pressure pump, not shown, but which readily can be supplied.

From the tank 71, feed pulp under pressure, indicated at 76, is adapted to be delivered directly to the different compartments of the filter by means as follows, see Figs. 2 and 4:—Secured to and extending entirely around the inside of the cylinder $b^2$ is a cylindrical ring 77 provided with holes or openings 78 which extend radially through the same, and secured in openings in the crowns of the hoods formed by the filter media 15 of the outer filter members d, are nipples 79, the projecting ends of which are secured in engagement with the holes or openings 78 in the ring 77, as shown. The holes 78 in the ring 77 are also connected to the tank 71 by reducing nipples 77', an end of each of which is secured to the wall of said tank in communication with a hole formed therein, and the opposite ends of which are secured in engagement with the holes 78 in the ring 77. Applied to the reducing nipples 77' are three-way valves, indicated at 77², Figs. 4 and 2ª, adapted to be opened and closed by contact of the valve handles 77³ secured to the stems of said valves with fixed pins 77⁴ and 77⁵, as the filter drum rotates, turning of said valves by contact of the valve handles 77³ with the pins 77⁴ operating to open said valves to admit feed pulp from the tank 71 to the filter compartments b—directly into the spaces 16 defined by the filter media 15, 15'—and with the pins 77⁵ operating to turn said valves to close said reducing nipples and to vent and drain said filter compartments.

As previously stated, air under desired pressure is adapted to be supplied to the filter compartments b in operation, the means for this purpose comprising a header 80, which is connected with a source of supply of compressed air by a pipe 82, see Fig. 2, and pipes 83 which connect said header directly with the filter compartments b outside of the filter media 15 of the outer filter members d, respectively; and a hollow header 84 secured to the end wall 1 of the drum B, which is in open communication with the header 73 through a pipe 85, Fig. 2. As shown, opposite side walls of the header 84 are connected by webs or partitions 86, Fig. 3, which, as shown, extend substantially radially with reference to the drum B, said webs or partitions being provided with holes through which all of the compartments of the header are in open communication with each other and, in operation, always contain air under pressure.

As shown, also, see particularly Figs. 3, 13, 14 and 15, the air supply connections of the filter comprise pipes 87 which connect the header 84 with the filter compartments b inside of the filter media 15' of the inner filter members d', the ends of said pipes being rigidly secured to the movably supported casing sections 3 and opening through the same.

To provide for contemplated movement of said casing sections 3 in dumping or discharging the contents of the filter compartments b—as heretofore described—said pipes are slidably fitted to and movable endwise in bearings 88 formed in the perimeter of the header 84, as shown, said header and the pipes 87 being proportioned to permit contemplated movement of the casing sections 3 in operation, while, at the same time— as hereinafter explained—maintaining communication of said pipes with said header.

As shown in Figs. 2 and 5, the pipes 83 and 87 are controlled, respectively, by valves 89 and 90 adapted both for admitting air under pressure to the compartments b of the filter, when open, and for venting and draining said compartments, when closed.

As shown, see particularly Figs. 13, 14 and 15, said valves 89 and 90 are three-way stop-cocks and, in the operation of the filter, are manipulated to open and close the same, respectively, by means as follows:—Each valve is of a usual type comprising a rotatable plug secured in which is a valve stem 91 having a handle 92 at its outer end. The valves 89 are adapted to be turned to open and close the same, by contact of the handles 92 thereof with fixed pins 93 and 94 secured in the frame of the filter in such positions, respectively, that, as the filter drum B rotates, opposite ends of the handles 92 of said valves will be brought successively into contact with said pins 93 and 94, contact of said valve handles with the pins 93 operating to turn said valves to admit air under pressure to the different filter compartments b outside of the filter medium 15, and with the pin 94 operating to close said valves to shut off the delivery of air under pressure to the filter compartments and to vent and drain said compartments. As shown, said pins are secured in the adjacent frame standard 7.

In like manner, the valves 90 which control the pipes 87, are adapted to be turned to open and close the same, by contact of the handles 92 thereof with fixed pins 95 and 96 secured in the frame of the filter in such positions, respectively, that as the filter drum B rotates, opposite ends of the handles 92 of said valves will be brought successively into contact with said pins 95 and 96, contact of said valve handles with the pin 95 operating to turn said valves to admit air under pressure to the different filter compartments b inside of the filter medium 15' of the inner filter member d', and with the pin 96 operating to close said valves to shut off the delivery of air under pressure to the filter compartments and to vent and drain said compartments. As shown, said pins are secured in a segmental ring 98 supported on the frame of the filter, as shown, its lower ends being rigidly connected to a frame member 4 by suitable brackets and being provided at its upper end with a bearing to which the crank shaft 51 is fitted to turn, thus providing a support for the top of said segmental ring.

To permit the valve handles 92 to pass the pins 93 to 96, associated therewith respectively, and to maintain them in operative position, said pins are resilient so that they will resume their operating positions after the valve handles have passed out of engagement therewith.

Assuming that, as shown in Fig. 1, the filter drum B rotates in clockwise direction, we will also assume that both sets of valves 89 and 90 are normally closed in operation to prevent the admission of air under pressure to the filter compartments b—that is, are in position to vent and drain said compartments.

With this assumption, the operation of the filter is as follows:—As soon as practicable after a compartment b has been discharged and returned to and locked in operating position on the filter drum B, the handle 77³ of the feed pulp supply valve 77² contacts with the fixed pin 77⁴, opening said valve to admit feed pulp to the space 16 of said compartment defined by the filter media 15, 15', said valve remaining open until the valve handle comes into contact with the fixed pin 77⁵ which will close the valve to the passage of feed pulp to said filter compartment and will simultaneously vent and drain said compartment, which preferably will occur a predetermined length of time before the rollers 46— by which the drum sections 3, which close the open side thereof, are supported when in dumping position—pass into engagement with the cross-heads 49.

In the interval of time between contact of a valve handle 77³ with the pins 77⁴ and 77⁵, respectively, pressure will be built up in said compartment from the source of feed pulp supply, which will subject feed pulp contained therein to a pressure substantially equal to the feed pulp pressure, thereby forcing liquid filtrate out of said pulp and through the filter media 15, 15', into the filter compartment exterior to the space 16 defined by the filter media 15, 15'.

Also, during the interval of time that the feed pulp supply valves 77² are open to supply feed pulp under pressure to the filter compartments, the valves 89 and 90 will be closed to prevent the passage of air under pressure into the filter compartments, thereby, as explained, permitting filtrate to drain from said compartment, but without loss of air pressure.

In accordance with the invention, also, practically simultaneously with the closing of the feed pulp supply valve 77², as a compartment b of the filter approaches dumping or discharging position, the handles of the valves 89 and 90, which, respectively, control the delivery of air under pressure to said compartment exterior to the space 16 defined by the filter media 15, 15' will respectively engage the pins 93 and 95, which will operate to admit air under pressure to said filter compartment in the manner described, which will produce pressure on the filter media in the reverse direction from the pressure exerted by the feed pulp, and will operate to expel any unfiltered liquid feed pulp contained in the compartment through the vent and drain opening of the feed pulp supply valve 77² applied to said compartment, thus very appreciably reducing the liquid content of the filter cake as discharged from the filter.

In the preferable construction shown, the valves 89 will again be closed by contact of the handles 92 thereof with the fixed pin 94, after the casing section 3 and filter member d' have been raised to and secured in closed position at the end of a dumping cycle, and rotation of the filter drum B has been resumed. As regards the valves 90, however, my invention contemplates a construction in which, after the filter cake adhering to the filter medium 15' has been loosened and dislodged, the air valve 90 applied to said filter compartment b will be closed during the dumping or discharging cycle by contact of the handle of said valve with a fixed pin 99, as the casing section 3 and filter member d' are raised from their lowermost position to closed position, the pin 99 being a resilient pin, thus permitting the valve handles 92 to pass the same on both the downward and upward strokes of the casing section 3 and the filter member d' carried thereby.

As a modification, however, I contemplate a construction in which the valves 90 as well as the valves 89 will also be open during the entire dumping cycle. To effect this, it is merely necessary to dispense with the fixed pin 99.

In accordance with the invention, also, opening of the valves 89 and 90 to expel liquid feed pulp from said compartment will also produce an air pressure in said compartment exterior to the space 16 defined by the filter media 15, 15', which will distend said filter media and tend to dislodge or loosen therefrom the filter cake deposited thereon.

When the filter compartment b comes into discharging position with the feed pulp supply valve 77² closed, and the air supply valves 89 and 90 open, and the section 3 of the filter drum B supported by the cross-heads 49—in which a dwell is imparted to the drum B during the discharging interval—rotation is imparted to the shaft 51 to cause the cross-heads 49 and with them the casing section 3 supported thereby and the filter member d' mounted on said casing section to execute a complete cycle from fully closed to fully open position and returned to fully closed position, all as heretofore fully described.

Said valves 89 and 90 will again be closed by contact of the valve handles 92 thereof with the fixed pins 94 and 96, respectively, after said filter member d' is again raised to and secured in closed position, and rotation of the filter drum B is resumed.

This series of operations will be repeated in continuous sequence during the operation of the filter, filtration being performed as a substantially continuous process or operation.

Important advantages inherent in my improved filter and process of filtration are:

1. That the filter is much smaller and can be installed in a smaller space than any filter having a comparable capacity, of which I have any knowledge.

2. Compared with other pressure filters of which I have any knowledge, it is more nearly continuous in operation.

3. Compared with other filters having a comparable capacity, the expense of construction, maintenance and repairs will be much less.

4. Individual units can be repaired while the remainder of the filter is in operation; and 5. By properly co-ordinating the size of the filter compartments and the operation of the filter, contact of the filter cakes deposited on the different filter media of each filter unit may be effected in operation during the final stages of filtration, when air under pressure is admitted to the filter chambers exterior to the space 16 defined by the filter media 15, 15', thus distending said filter media towards each other to bring the filter cake deposited on said filter media, respectively, into contact with each other, causing them to cohere to form a single cake which relatively, is appreciably thinner than the initial width of said space 16, and the weight of which will equal and probably exceed that of the two separate cakes, such reduction in size and increase in weight facilitating dislodgment and discharge of said filter cake from the filter chamber, in an obvious manner.

6. In other pressure filters of which I have knowledge, where the time of filtration of successive charges is uniform, the dryness of the filter cake will vary with the filterability of the material, whereas in my filter the maximum dryness of the cake is always obtained while only the thickness of the cake varies with filterability. This is of great importance in processes where the object of filtration is the dehydration of the cake for further processing of the same.

7. By cohering the separate filter cakes into one, I produce a single cake which, in addition to being thicker, is relatively dry on both sides and is, therefore, more easily handled than the usual filter cake.

While I have herein described what I now consider a preferable arrangement of the devices for effecting filtration of the feed pulp and for dislodging and discharging the filter cake from the different filter compartments b, in operation, I do not desire to limit myself to the particular cycle of operations shown, as, within the scope and contemplation of the invention, the system of filtration in accordance with my invention may be variously modified without the exercise of invention and I, therefore, claim as my invention any system of filtration coming within the scope of the appended claims.

The expressions "feed pulp" or "pulp" as used in the specification and claims are general terms employed to indicate generally any type of material that may be employed, certain specific materials having been referred to as examples and not in a limiting sense.

I claim:

1. In a filter, the combination of a housing provided with an open-sided compartment, the side walls of which diverge outwardly, a removable closure for the open side of said compartment, pliable filter media in the form of hoods shaped and proportioned to fit one within the other, the edges of the outer filter medium being attached to the wall of the housing adjacent the edge of the opening therein, and those of the inner medium to the closure for said opening, and means for supporting said filter media distended and in spaced relation to each other so as to define a closed space between them.

2. The filter specified in claim 1, in which the filter media are maintained distended by skeleton frames to which they are adjusted, respectively.

3. In a filter, a unit comprising, when ready to begin work, a first plate, a second plate removable relatively to said first plate, said plates being substantially parallel with each other, closure means co-operating with said plates to form a chamber, and a first and a second drainage grid substantially covering the inward faces of said two plates respectively, and being normally fixed relatively to said plates respectively, said unit further comprising a first and a second filtering cloth covering the inward faces of said grids respectively, means for feeding pulp into said chamber at a feeding pressure, thereby pressing said cloths against said grids respectively, means for thereafter forcing air at a stripping pressure into said first grid and into the chamber at the front of said grid, to thereby strip said first cloth from said first grid, and to follow said first cloth to push it toward said second cloth, and means for removing said second plate, from its initial position as hereinabove described relatively to said first plate, for the purpose of discharge, said second plate carrying with it said second cloth.

4. The method of filtering which consists in feeding pulp at a feeding pressure between a first filtering cloth and a second filtering cloth, opposed to each other, in permitting liquid to escape through said two opposed cloths while said cloths prevent the passage therethrough of solids, until solids have collected against said cloths to a substantial thickness, thereby forming two opposed layers of material of a consistency less fluid than that of the material intervening between said two layers, and in then pressing said first cloth toward said second cloth, thereby causing said two layers of material to approach each other and to thereby expel a substantial quantity of said intervening material.

5. The method of filtering as claimed in claim 4, said two layers of material then together forming substantially one mass, of a consistency substantially less fluid than that of the original pulp, and said method further consisting in stripping off said second wall from said mass at a suitable stage thereafter.

WILLIAM U. VINTON.